United States Patent [19]

Masujima et al.

[11] 4,243,139
[45] Jan. 6, 1981

[54] APPARATUS AND PROCESS FOR THE MANUFACTURE OF ELECTRONIC COMPONENTS

[75] Inventors: Sho Masujima; Yamamoto Yoshihito, both of Tokyo, Japan

[73] Assignee: Tokyo Denki Kagaku Kogyo Kabushiki Kaisha, Tokyo, Japan

[21] Appl. No.: 791,363

[22] Filed: Apr. 27, 1977

Related U.S. Application Data

[63] Continuation-in-part of Ser. No. 597,933, Apr. 22, 1975, abandoned.

[30] Foreign Application Priority Data

Jul. 22, 1974 [JP] Japan ................. 49-83893

[51] Int. Cl.³ ......................................... B65D 73/02
[52] U.S. Cl. ................................................. 206/330
[58] Field of Search ................. 206/328-331, 206/343-345, 813; 29/628

[56] References Cited

U.S. PATENT DOCUMENTS

| | | | |
|---|---|---|---|
| 2,757,792 | 8/1956 | Shioleno | 206/330 |
| 2,766,510 | 10/1956 | Heibel | 206/330 X |
| 2,929,130 | 3/1960 | Packaran | 206/330 X |
| 3,086,652 | 4/1963 | Lipscomb | 206/331 |
| 3,125,168 | 11/1965 | Dian et al. | 140/71 |
| 3,135,375 | 6/1964 | Henn et al. | 206/330 |
| 3,231,082 | 1/1966 | Weiss | 206/330 X |
| 3,398,768 | 8/1968 | Van Houf | 140/147 |
| 3,650,706 | 3/1972 | Parsons | 206/330 X |
| 3,695,414 | 10/1972 | Wiesler et al. | 206/330 |
| 4,077,439 | 3/1978 | Hamuro et al. | 140/1 |

FOREIGN PATENT DOCUMENTS

| | | | |
|---|---|---|---|
| 774074 | 5/1957 | United Kingdom | 206/331 |
| 806738 | 12/1958 | United Kingdom | 206/331 |

*Primary Examiner*—Stephen Marcus
*Attorney, Agent, or Firm*—Blum, Kaplan, Friedman, Silberman and Beran

[57] ABSTRACT

In an apparatus and process for transport and support of electronic components, the leads of the components are mounted transversely and parallel to each other on a support strip adapted for being moved in a longitudinal direction. The leads are mounted so that they are parallel to each other and equidistant and held firmly in position by adhesive tape of specified thickness in relation to the thickness of the support strip. The leads protrude from at least one edge of the support strip to facilitate attachment of electronic components. Positive positioning of the leads at accurately spaced distances is achieved.

5 Claims, 17 Drawing Figures

APPARATUS AND PROCESS FOR THE MANUFACTURE OF ELECTRONIC COMPONENTS

CROSS REFERENCE TO RELATED APPLICATION

This is a continuation-in-part of U.S. patent application Ser. No. 597,933, filed April 22, 1975 now abandoned.

BACKGROUND OF THE INVENTION

In the manufacture of electronic components, particularly where the components are to be manufactured in large scale production, it is necessary that the components be positioned with great precision, this necessity arising from the fact that many of the components are so minute. This necessity extends to the leads, giving rise to substantial problems due to the fact that the leads are relatively fragile, easy to bend out of shape, and yet must be positioned with precision equal to that of the components. Where manufacture is to be carried out at high rate and the components are to meet exacting quality standards, methods of transporting components have been inadequate with regard to the exacting conditions required.

SUMMARY OF THE INVENTION

Apparatus for carrying out the manufacture of electronic components includes a transportable support strip to which electronic component lead wires can be fastened. The support strip is so designed that the lead wires are positively and precisely positioned at uniform intervals. The lead wires are positioned transversely to the support strip and protrude over at least one edge of the support strip, this protrusion facilitating the attachment of electronic components to the lead wires. The lead wires may be held to the support strip by means of grooves transverse to the support strip, holes in the support strip transverse to same or by adhesive tape.

The support strip, and the tape, if present, have holes, grooves or protrusions therein which mesh with a driving means for transporting the support strip in the longitudinal direction of the support strip. The holes, or protrusions are uniformly spaced longitudinally of the support strip.

The driving means for transporting the support strip may be a wheel having pegs thereon which fit into corresponding openings in the support strip.

A single transverse groove may serve to hold a pair of lead wires, if the wires are joined at one end and are bent so that they are biased outwardly, the grooves being undercut at both edges thereof. Accurate locating of the grooves or holes for holding the leads and of the holes, grooves or protrusions for engaging the driving means leads to positive and precise positioning of the electronic component leads held by the support strip, and, similarly, of the electronic components attached to the component leads.

Accordingly, an object of the present invention is an apparatus for holding electronic component lead wires and electronic components before, during and after manufacture with positive, precise positioning relative to each other, and for transporting same before, during and after conclusion of the manufacturing process.

Another object of the present invention is a simple and precise means for advancing electronic component wire leads and such electronic components as are attached to them through the stages of manufacture with great precision and reliability.

A further object of the present invention is a method of transporting electronic component wire leads and electronic components attached to said leads through the stages of a manufacturing process on a large scale and with high reliability, as well as precise and positive positioning.

An important object of the present invention is a method of transporting electronic component wire leads and electronic components at high rate and with complete safety as well as reliability through the stages of a manufacturing process.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
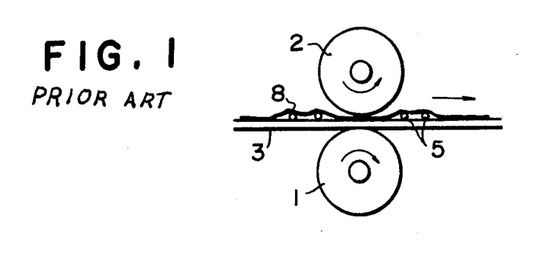
FIG. 1 is a view in elevation of a device in accordance with the prior art for transporting electronic component wire leads through an assembly line.

Conventional apparatus for transporting lead wires of an electronic component and the electronic component itself when attached to said lead wires through manufacturing steps such as soldering, coating or measurement thereof is shown in FIG. 1. A pair of rolls 1 and 2 drive between them a support member 3 in compressed state, the lead wires 5 of said electronic components (not shown) being held by tape 8 to said support member 3. The condenser or other electronic component is positioned on support member 3 by the nail plate 4 of FIG. 2, the nail plate moving over the course as indicated by the arrows bearing the reference numeral 4a.

Figure 2:
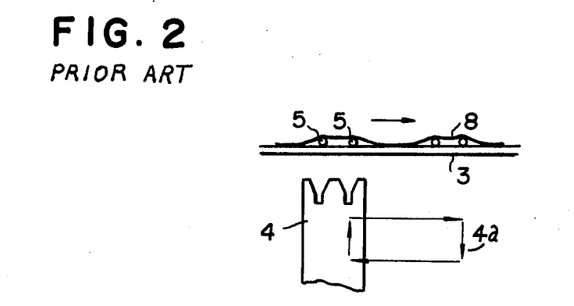
FIG. 2 is a device in accordance with the prior art showing conventional means for positioning electronic component wire leads in a transport mechanism.

The use of the nail plate 4 serves to position either the lead wires 5 by themselves or the component which is attached thereto. As is evident, the feed error is substantial so that positioning fails to meet the high requirements for precision which must be met if proper processing is to be carried out. Accordingly, components of good quality are difficult to obtain by the use of the conventional methods as illustrated in FIGS. 1 and 2, and these difficulties are accentuated when the attempt is made to carry out processing steps at high rate.

Figure 3:
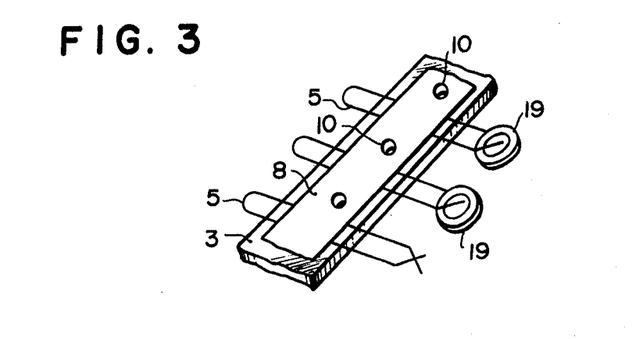
FIG. 3 is a preferred embodiment of the present invention showing a support strip for transporting wire leads and electronic components attached to said wire leads.
Figure 13:
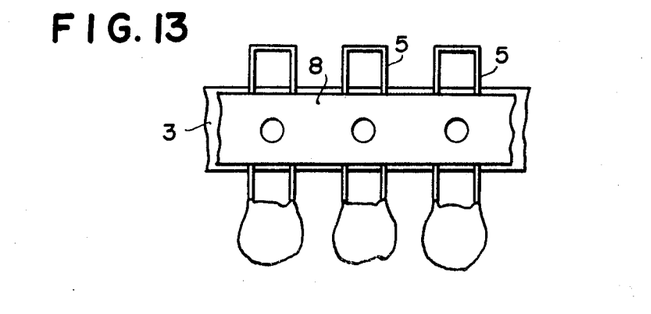

In a preferred embodiment shown in FIG. 3, a plurality of U-shaped lead wires 5 are uniformly positioned on support member 3, the lead wires 5 being fixed to support member 3 by adhesive tape 8. Holes 10 are formed at precisely positioned intervals in the longitudinal direction and along the transverse midpoint of support member 3 equidistantly between lead wires 5 of adjacent electronic components 19 by means of a suitable punch. In another preferred embodiment shown in FIG. 13, the holes are formed equidistantly between lead wires 5 of a single electronic component 19. The holes 10, as will be described, function as part of the transport mechanism. The back surface of support member 3 is essentially flat thereby making it possible to transfer the electronic components precisely and to facilitate winding the strip on a winding core or a reel.

The width of the adhesive tape 8 is narrower than the width of support member 3 for several reasons. First, exact positioning of tape 8 onto support member 3 in the direction of width is not critical so long as the adhesive surface of tape 8 is not exposed outside supporting member 3. If the adhesive extends beyond support member 3 or the lower surface of the series of electronic components, problems will result during winding components 19 on a core or a reel. Further, this embodiment facilitates measurement of electric characteristics of the finished products such as capacitance, resistance and the like. A contact element can be butted to part of the leads that extend outwardly from the edge of adhesive tape 8, but remain on supporting member 3, whereby the supporting member 3 acts as a support for measuring means and prevents the leads from being deformed or broken accidentally.

The series of electronic components 19 as a whole are heavier than support member 3. In order to feed electronic components 19 into an automatic printed circuit board inserting machine and have them inserted into the board precisely, support member 3 and electronic components 19 must be free from deformation such as elongation and twisting. In addition, since the support member 3 and electronic components 19 are to be wound on a core or a reel, support member 3 be elastic in the direction of winding in addition to satisfying the above-mentioned requirements.

Once lead wires 5 of electronic components 19 are fixed onto support member 3 by adhesive tape 8, the components must not entangle themselves which could result in breakage during the winding operation onto a core or a reel, or during the transportation of the components. These requirements, are accomplished by controlling the relationship between the thickness of support member 3 and adhesive tape 8. The ratio of thickness (D/T) of support member 3 to adhesive tape 8 in conjunction with a proper material for support member 3, permits a series of electronic components to be transferred or fed under extremely exacting conditions and inserted automatically into a printed circuit board in an extremely smooth manner. Ranges of thickness ratios are set forth below.

Support member 3 is made of a relatively flexible material as most typically exemplified by paper tape, such as, Japanese paper, kraft-liner paper using regenerated kraft paper only for its surface layer and board-like thick paper of a large cushioning action containing a polymeric material such as nylon, foamed stryrol, etc., as a hollow material. Since kraft-liner paper is of a sulfuric acid-type pulp, it may cause chemical reaction between the leads of electronic components. Hence, the surface layer of the kraft-liner paper, that is to say, the contacting surface with the leads, is covered with regenerated kraft paper. In order to impart the support member 3 with a proper tensile property in the longitudinal direction, it is preferred to use such paper in which linear fibrous elements of metallic fibers or non-metallic fibers are woven into the Japanese paper or synthetic paper in the longitudinal direction of the paper.

When Japanese paper or synthetic paper having a small elasticity in the direction of thickness is used for support member 3, the thickness ratio D/T is preferably within the range of 1.5 to 5, and more preferably within the range of 2.5 to 3.5. When support member 3 is made of board-like thick paper of large cushioning type, D/T is preferably within the range of 5 to 15, and more preferably within the range of 7.5 to 12.5.

When support strip 3 is made of the above-mentioned materials, elongation, twisting and deformation in the longitudinal direction is controlled. Thus, electronic components 19 can be positioned with precise dimensional accuracy and be wound on a reel easily and securely. When the thickness ratio is maintained within the ranges of the invention, taping and fitting of electronic components 19 to support member 3 are stable and precise. In addition, the accuracy in positioning between each electronic component is improved markedly. The present invention provides components supported with precise equal spacing which improves the insertion reliability of an automatic printed circuit board inserting machine. It also permits stable high speed operation of the inserting machine.

As shown in FIG. 3, holes 10 are punched both in the adhesive tape 8 and in support member 3, but there are embodiments of the invention in which the holes need be punched only in support member 3. As will be noted, electronic components 19 may be fastened to lead wires 5 and supported thereby.

Figure 4:
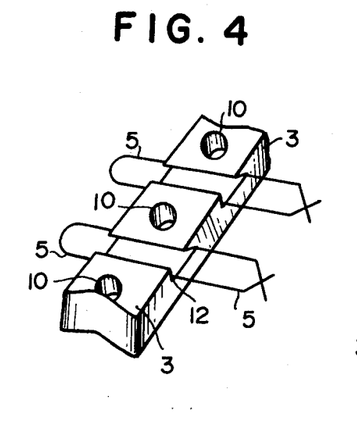
FIGS. 4 and 5 are second and third embodiments of the present invention showing how wire leads are held.

A second means of positioning lead wires 5 with great precision in support member 3 is shown in FIG. 4. Support member 3 in the embodiment shown in FIG. 4 has transverse grooves having undercut walls. Lead wire 5, bent in the form of a U, is bent so that the legs of the U are biased outwardly, as a result of which said legs are firmly seated in the notches formed by the undercut walls of the grooves 12.

Figure 5:
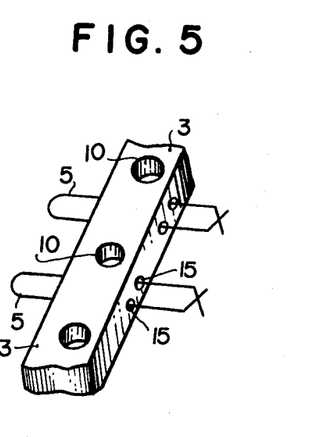

A third means of holding lead wires 5 in support member 3 is shown in FIG. 5, the lead wires being inserted through transverse holes 15 in support member 3. Again, holes 15 are positioned with great precision in support member 3 so that the components mounted on lead wires 5 will be precisely spaced equidistantly. Similarly, holes 10 to be used for transporting support member 3 are also positioned precisely in support member 3.

In the embodiments shown in FIGS. 4 and 5, perforated support member 3 may be of either a flexible or a rigid material. Suitable materials are paper, as described above with respect to the embodiment shown in FIG. 3, or metals and synthetic resins. Moreover, support member 3 may be in the form of a belt, may be of substantial length, or may be of relatively limited length.

Figure 6:
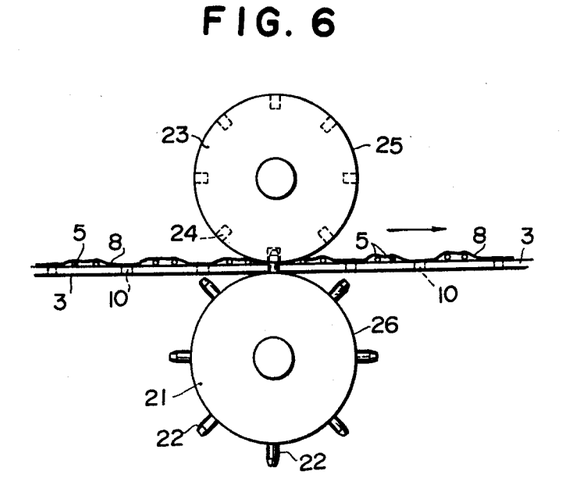
FIG. 6 is a view in elevation of the preferred embodiment of the present invention showing driving means.

A drive mechanism for transporting support member 3 and lead wires 5 and the electronic components attached thereto is shown in FIG. 6. Drive wheel 21 has pegs or pins 22 on the periphery thereof, the distances between adjoining pins corresponding to the distances between adjoining holes 10 in support member 3. A wheel 23 having sockets 24 around the periphery 25 thereof is mounted at the opposite face of support member 3, so that the pins 22 on the periphery 26 of drive wheel 21, on passing through holes 10 of support member 3 enter the sockets 24 of opposing wheel 23. This drive mechanism provides extremely precise positioning and transport for support member 3 and the electronic components mounted thereon.

Figure 7:
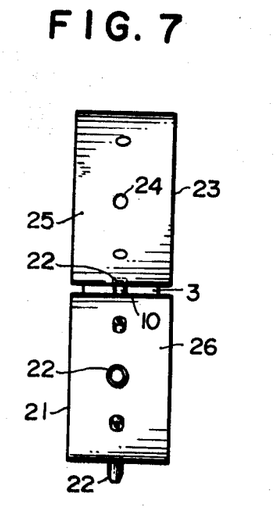
FIG. 7 is an end view of the device of FIG. 6.

FIG. 7 is an end view of the embodiment of FIG. 6. As can be seen, support member 3 is held firmly in position between periphery 26 and 25 of drive wheel 21 and opposing wheel 23 respectively. This means of transport can be applied not only for taking the lead wires and the associated electronic components through the assembly line and the various steps of the manufacturing process, but can serve to transport the finished components through stages of inspection, assembly and packaging.

Figure 8:
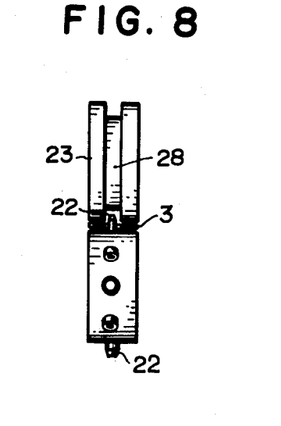
FIG. 8 is another embodiment of the device of FIG. 7.
Figure 9:
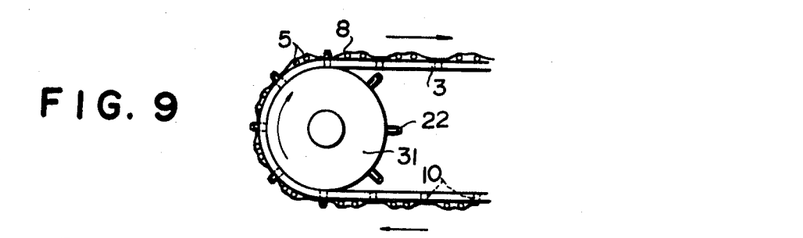
FIG. 9 is an embodiment of the present invention in which only one drive wheel is needed.

Since precise positioning of the components on support member 3 depends on the relationship between pins 22 of drive wheel 21 and the holes in support member 3, matching sockets 24 in opposing wheel 23 are not completely necessary. A simpler embodiment of opposing wheel 23 is shown in FIG. 8 wherein a groove 28 is substituted for the sockets 24 of FIG. 7.

Where support member 3 is of a flexible material such as paper or plastic, it can be carried around the face of drive wheel 31 as shown in FIG. 9. In this case there is no need for the opposing wheel 23 of FIGS. 7 and 8.

Figure 10:
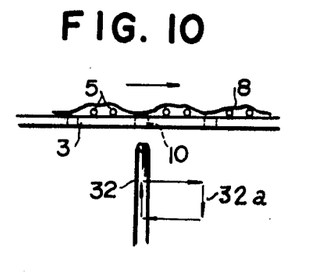
FIG. 10 is an embodiment of the present invention in which a single finger is used for advancing the support strip of the present invention.
Figure 11:
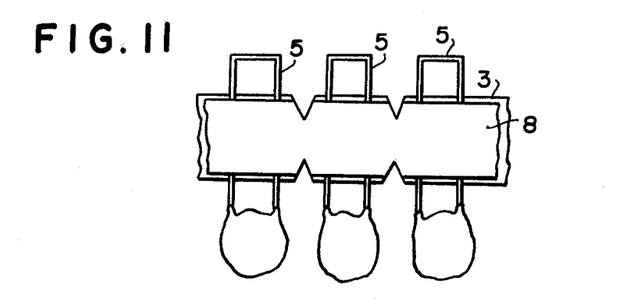
FIGS. 11, 12 and 13 show support strips in accordance with the present invention embodying different means for engaging a drive mechanism.
Figure 12:
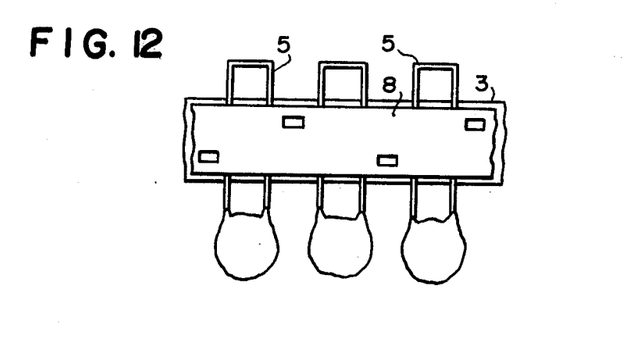

In FIG. 10 is shown an embodiment for intermittent transport of support member 3. Transport is effected by carrying pin 32 through the series of movements indicated by the arrows having the reference numeral 32a. Pin 32 is inserted into hole 10 and then moved to the right as shown in FIG. 10, thereby moving support member 3 to the right, after which pin 32 is withdrawn and moved back to its original position.

It should be noted that the engaging portions of support member 3, holes being an example of an engaging portion, are used not only for transport of support member 3 but also for positioning same and electronic components 19 attached thereto, said positioning being carried out with great precision. Moreover, by the use of two pins (not shown) two engaging portions such as holes 10 may be used simultaneously for positioning the electronic component held therebetween. However, in general, sufficiently precise positioning can be achieved through the use of a single hole or other engaging portion.

The shape or form of the hole or groove which cooperates with the drive means is not particularly critical. In addition to a hole which passes completely through support member 3, there can be a socket which does not completely penetrate support member 3, a groove-like concavity or the like. Examples of such apertures, grooves, etc., for cooperating with the drive means are shown in FIGS. 11–14. Such hole, groove, or socket may be formed either inside the edge of the support member 3 or on the edge of the support member as a notch. The hole or groove or socket may be round, oval, square or triangular in form. The holes or grooves may be arranged in a single row longitudinally of the support strip, or in a plurality of rows or in a zig-zag line. Further, the pitch or separation of the holes or grooves which cooperate with the drive means may be such that there are a plurality of engaging portions, i.e., drive-cooperating means, in the support member per electronic component. Conversely, there may be a plurality of electronic components per engaging portion One skilled in the art will be able to make a selection of combinations of drive means and conformation of the support member so as to achieve the desired precision of location while avoiding pitch error and deformation of the lead wire.

Figure 14:
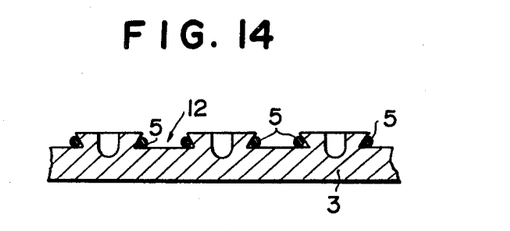
FIGS. 14, 15, 16 and 17 show, in longitudinal cross-section, four support strips having different means of spacing wire leads.
Figure 15:
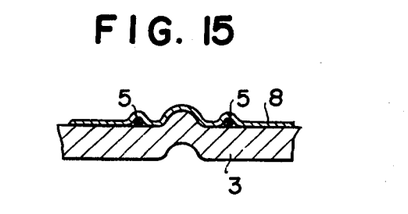

It is possible to use the tapered grooves 12 as shown in FIGS. 4 and 14 both for holding and supporting the lead wires, as aforenoted, and for meshing with the feed mechanism. Thus, as shown in the embodiment of FIG. 15 the back of support member 3 has a groove or other concavity between lead wires of one electronic component and a corresponding projection on the front side of the support member. The lead wires can be securely and precisely positioned with respect to the support member by means of adhesive tape, simultaneously positioning the electronic component which may be attached to the lead wires with equal precision.

The method of forming such engaging portions is of course well-known. Thus, boring of hole 10 can be carried out while the lead wires 5 are held to the supporting member and then the resulting hole 10 utilized for subsequent operations. Transportation and positioning of the portions which mesh with the drive mechanism can be performed not only by means of the feed mechanism including projecting pins but also by means of a feed mechanism comprising matching projections. Also, transverse ridges may be utilizied for meshing with groove-like concavities for transverse projections.

Figure 16:
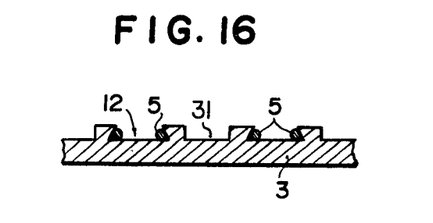
Figure 17:
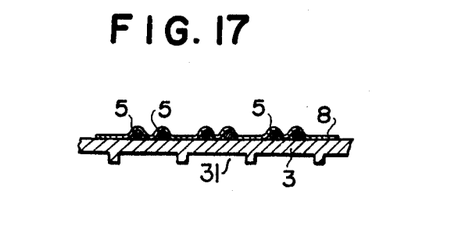

In the foregoing embodiments, relatively small concavities or holes have been shown for meshing with the drive mechanism. However, in accordance with the present invention, it is also possible to use an arrangement such as those shown in FIGS. 16 and 17 in which concavities 31 are of relatively large size and the matching convexities are of relatively small size. Furthermore, it is possible to use pin-like projections as the convex portions.

As is apparent from the embodiments described, both transport and positioning of the electronic components are performed by means of engaging portions disposed equidistantly on support member 3. Accordingly, the position of the electronic component per se or the distance between consecutive electronic components can be fixed positively and with great precision. Furthermore since the lead wires themselves do not receive directly any thrust for transport of the support member and the components held thereon, the lead wires are prevented from being damaged, bent or deformed in any way. Consequently, not only the position of the electronic components but also of the lead wires can be fixed positively and with precision. One advantage of such a system of transport is that when a finished product such as a condenser, or resistor, or other electronic component is brought forward for the next step in the process such as, for example, inserting the component into its proper position in a printed circuit, the position of the component can be fixed positively and the error in positioning can be essentially completely eliminated. Consequently, insertion of an electronic component can be carried out at high speed with high reliability, completely automatically and with great saving in labor, such advantages having been difficult to achieve by conventional methods.

Although the lead wires of the electronic components have been shown as being parallel to each other and positioned equidistantly, there may well be situations in which it is desirable that the lead wires in a single component not be parallel to each other and in which it may be desirable that the distances between successive components should vary. As is evident, the support and feed mechanisms described herein are such that such variations can be effected.

It should be noted that long products can be prepared very easily using the mechanisms described herein, and, on packaging, the products can be arranged in a very compact form without bending of lead wires and shipping can be greatly facilitated. Furthermore, connection of two or more electronic components can be performed easily and with high accuracy if engaging members such as holes are utilized as base points for carrying out the connection operation.

The above-mentioned transportation and positioning can be carried out also on an incomplete portion of an electronic component with certainty at any step of the manufacturing process. For example, in the case of an electronic component such as a condenser, transport or positioning can be performed assuredly with high dimensional precision at and among such manufacturing steps as substrate formation, soldering, coating, measurement and marking. Further, the structure of the transport mechanism can be simplified, and the manufacturing rates improved by the use of the transport mechanism described herein. As a result, substantial improvements in automation and labor saving can be effected.

The preparation process of the present invention includes not only an entire process comprising all of the manufacturing steps ranging from the first step to the last step of recovery of the finished product, but also a partial process comprising one or more of the preparative steps. Moreover, the present invention includes a process in which holes as engaging portions for use in cooperation with a drive means are formed simultaneously when lead wires of an electronic component such as a condenser are supported on a support member, and the support member is fed and transported continuously or intermittently by utilizing these holes. Also, the material for the electronic component which is thus transported or positioned by these holes is subjected to such operations as soldering, coating, measurement, withdrawal and shifting in the state where the material of the electronic component is held and supported assuredly, a process in which holes and grooves are equidistantly formed as engaging portions on a support member, transportation or positioning is conducted by utilizing these engaging portions, and processing is carried out while lead wires are being held in the grooves, and a process in which only grooves are formed as engaging portions and used for holding lead wires and these engaging portions are also utilized for transportation and positioning.

In accordance with this invention, by virtue of the feature that lead wires for electronic components are held and supported by a support member having engaging portions disposed equidistantly in the longitudinal direction, to form a series of electronic components, transport or positioning of the electronic component can be accomplished by utilizing the engaging portions and therefore the position and distance of the electronic part or portion per se can be set assuredly with certainty and with great precision. Moreover, since lead wires do not receive directly any thrust or driving force for transport of the system, they are effectively prevented from being damaged or bent. Accordingly, the position and separation of the lead wires as well as the electronic part or component can be set assuredly with certainty and transport and positioning of the entire assembly can be performed with ease and certainty. Therefore either in the case of an operation in which a finished product is treated or in the case of an operation in which a material is treated for being formed into an intended product, transport and positioning can be performed assuredly with certainty, reliability and great precision, and the speed of such operation can be greatly enhanced. Thus, in accordance with this invention there can be obtained great effects concerning automation and labor-saving so that the present invention makes a substantial contribution to the art of manufacturing electronic components.

It will thus be seen that the objects set forth above, among those made apparent from the preceding description, are efficiently attained and, since certain changes may be made in carrying out the above process and in the construction set forth, without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A continuous web of a plurality of electronic component having parallel lead wires suitable for inserting each electronic component into openings of a printed circuit board completely automatically by an automatic inserting machine, comprising a support member for supporting and positioning the parallel lead wires, said support member including a continuous support strip and a continuous opposing support tape, the parallel leads of the axial lead electronic components disposed substantially perpendicularly across the support strip, said support tape having an adhesive on the face thereof facing said support strip, said support strip and said support tape cooperating to hold firmly said lead wires therebetween, the width of said support tape being slightly narrower than the width of said support strip, said support tape and support strip having drive-cooperating means for receiving a drive for transporting and positioning said lead wires and attached electronic components, said drive-cooperating means being circular holds perforated through said support strip and support tape together, said circular holes being spaced apart equidistantly between said lead wires of adjacent electronic components and at precisely positioned intervals in the longitudinal direction along the transverse midpoint of said support strip and tape, the reverse side of said support strip being flat 2. The apparatus of claim 1, wherein said support strip is Japanese paper.

3. The apparatus of claim 2, wherein the ratio of thickness of said support member to said tape is from 1.5 to 5.

4. A continuous web of a plurality of parallel lead electronic components comprising:
- a continuous support band;
- a plurality of parallel lead electronic components disposed on said support band with the parallel leads perpendicular to said band;
- a continuous adhesive tape having a width less than the width of the support band disposed across the parallel leads of the components for firmly holding the parallel leads between the tape and the band; and
- substantially circular openings formed through the tape and the band equidistantly between the parallel leads of adjacent electronic components along the transverse midpoint of the support band.

5. A process for the manufacture of a series of electronic components having parallel lead wires, comprising in sequence, the steps of mounting lead wires equidistantly on a support strip having a longitudinal direction, said lead wires being positioned transversely to said support strip and protruding from at least one edge thereof for facilitating attachment to an electronic component, placing the adhesive-coated face on an adhesive tape having a width slightly narrower than that of said support strip coated on only one face against said support strip for fixing firmly and precisely said lead wires therebetween, forming circular holes simultaneously in both said support strip and said adhesive tape at precisely positioned intervals in the longitudinal direction along the transverse midpoint of said support strip equidistantly between said lead wires of adjacent electronic components, moving said support strip in said longitudinal direction by the use of a rotating drive wheel constructed and arranged to meet with said circular holes, and fastening electronic components to said lead wires for support, transport and positioning thereby.

* * * * *

UNITED STATES PATENT AND TRADEMARK OFFICE
CERTIFICATE OF CORRECTION

PATENT NO. : 4,243,139
DATED : January 6, 1981
INVENTOR(S) : Sho Masujima and Yoshihito Yamamoto It is certified that error appears in the above—identified patent and that said Letters Patent is hereby corrected as shown below:

Column 8, line 43-44, change "component" to --components--.
        line 51, delete "axial lead"
        line 62, change "holds" to --holes--.
Column 9, line 4, change "member" to --strip--.

Signed and Sealed this

Twenty-ninth Day of December 1981

[SEAL]

Attest:

GERALD J. MOSSINGHOFF

Attesting Officer     Commissioner of Patents and Trademarks